May 6, 1952 F. C. SCHWANEKE 2,595,985
DRINK MIXER AGITATOR
Filed April 17, 1948 2 SHEETS—SHEET 1
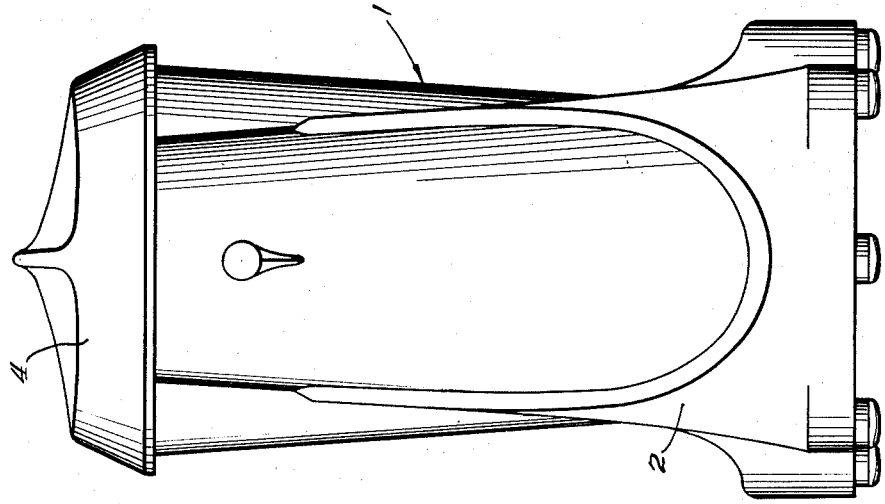
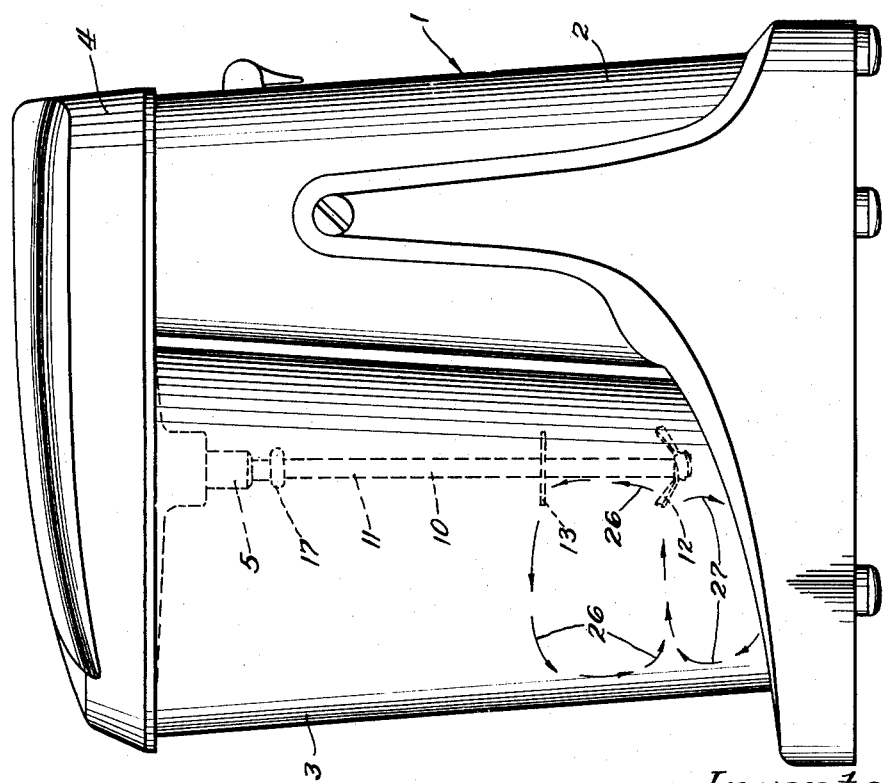
Inventor:
Fred C. Schwaneke
By
Atty.

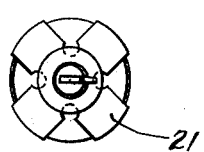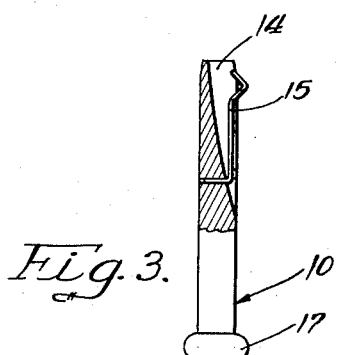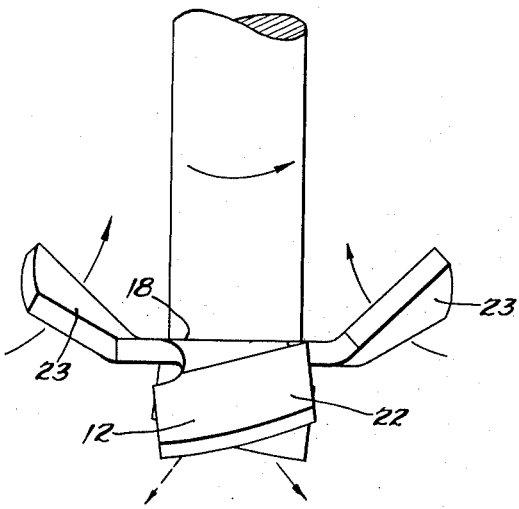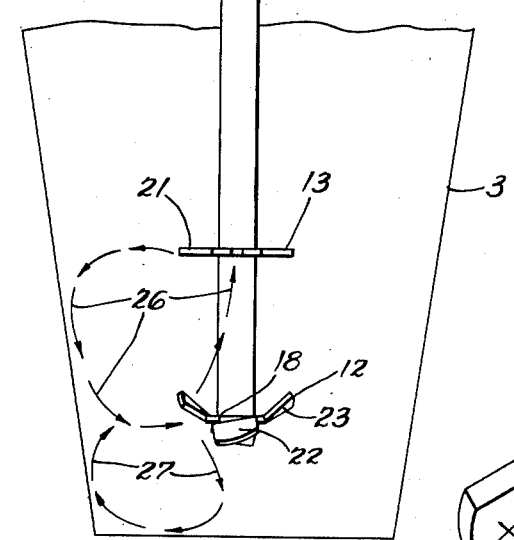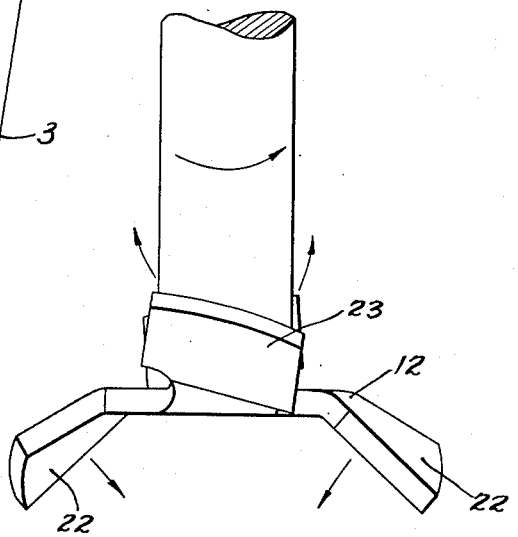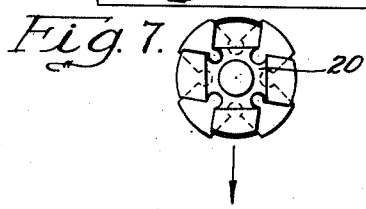

Patented May 6, 1952

2,595,985

UNITED STATES PATENT OFFICE 2,595,985

DRINK MIXER AGITATOR

Fred C. Schwaneke, Chicago, Ill., assignor to Dormeyer Corporation, Chicago, Ill., a corporation of Illinois Application April 17, 1948, Serial No. 21,717

3 Claims. (Cl. 259—134)

This invention relates generally to drink mixers and more particularly to an improved rotary agitator for use in a drink mixer which mixes and disintegrates.

Drink mixers are widely used in soda fountains, restaurants, and homes for the mixing of such beverages as milk shakes, malted milk drinks, cocktails, etc. Most mixers are used primarily to blend mixtures of ice cream or fruit ices with milk or other liquids and flavors to produce the desired drink. Where a mixer is to be used in a soda fountain or restaurant, it is particularly important that it operate to mix the drink quickly so that customers are not kept waiting while the mixer is in use and/or fewer mixers are required.

Where such drinks as milk shakes or malted milks are mixed of milk and ice cream, the mixing device must not only mix the components but also must disintegrate the solid ice cream into small particles. It is particularly desirable that the small particles of ice cream be formed rapidly in order that a minimum of melting will occur during the mixing process. Hence, the speed at which a mixer mixes the drink is important not only from the standpoint of the number of drinks which may be mixed but also in that it affects the quality of the resulting beverage.

The mixers commonly in use usually comprise a vertically mounted motor supported on a pedestal above a removable cup or glass and an agitator or beater which extends downwardly into the cup and is coupled directly to the motor shaft. Other mixers have the motor mounted beneath the cup and an agitator shaft journalled in the bottom of the cup which extends from a coupling on the top end of the motor upwardly into the cup. Still other mixers have a motor located to one side of the cup and power transmission elements such as gears or belts which transmit rotary motion from the top end of the motor to a vertical agitator shaft extending upwardly from within the cup.

The agitator of this invention may be used without modification in those types of mixers where it is disposed in the vertical position and extends downwardly into the mix and with slight modification in those mixers where the shaft extends through the bottom of the cup being coupled to a motor shaft below the cup.

One object of this invention is to provide an agitator which serves to rapidly mix the ice cream drink and which operates at a high speed requiring relatively little power.

Another object is to provide an agitator which not only thoroughly mixes the constituents but also breaks down or disintegrates the lumps of solids into small particles.

Another object is to provide an agitator which causes a minimum amount of cavitation or whirl-pooling in the mix as it is rotated.

Another object is to provide an improved method of mixing liquid and solid ingredients to form a drink wherein particles of the solid ingredient are simultaneously comminuted and mixed into the liquid ingredient.

A further object is to provide a bladed mixing element for use on a rotating agitator having individual blades pitched and inclined in opposite directions in order to encompass a greater effective mixing area and to direct portions of said mix in different directions.

A further object is to provide an agitator having a pair of mixing elements thereon, one of which serves as a disintegrating and anti-cavitation element and the other of which serves to impel portions of the mix into aforesaid element.

A further object of this invention is to provide an agitator which may be easily and inexpensively constructed of rod stock and sheet metal stampings.

Other and additional objects and advantages of this invention will, of course, present themselves to those familiar with the art on reading the following specification in conjunction with the drawings and the appended claims.

In the drawings:

Fig. 1 is a view of a mixer provided with the agitator of this invention;

Fig. 2 is a side view of the mixer;

Fig. 3 is a vertical view partly in section showing the agitator of this invention and its location with respect to the mixing cup;

Fig. 4 is an enlarged view showing the impeller element;

Fig. 5 is an enlarged view similar to Fig. 2, the agitator being rotated 90° from the position of Fig. 2;

Fig. 6 is a top view of the agitator shown in Fig. 1; and

Fig. 7 is a bottom view of the agitator shown in Fig. 1.

A mixer 1 equipped with the preferred embodiment the agitator 10 is shown in Figs. 1 and 2. The mixer 1 comprises a base 2, a mixing glass or cup 3, and a cover member 4. The cover member 4 and cup 3 are removable from the base 2 for purposes of filling and emptying the cup 3.

The motor (not shown) is mounted within the upright portion of the base 2 in the vertical position. The upper end of the motor shaft is detachably coupled to a pulley (not shown) journaled in the cover member 4, and a belt transmits motion of this pulley to a similar pulley attached to the upper end of agitator socket 5. The socket 5 is hollow and receives the upper end of the agitator 10.

When the cover member 4 is removed from the base 2 by lifting it upwardly, the agitator 10 is lifted out of the cup 3, and the cup 3 may then be removed.

Although the agitator 10 is shown to be displaced from the center of the cup 3, in some instances it has proved desirable to locate it at the center of the cup 3.

The preferred embodiment of the agitator 10 of this invention is best shown in Fig. 3 and comprises a shaft 11 having an impeller element 12 at its lower end and a disintegrator element 13 spaced a short distance above the impeller 12. At the upper end of the shaft 11, a slot 14 is provided which receives a spring element 15 for coupling the agitator to the socket 5 rotatively driven by the electric motor. A ring 17 having a rounded outer contour is supported on the shaft 11 just below the bottom of the slot 14. This ring 17 serves a dual purpose providing a hand-hold for the fingers when the agitator 10 is to be removed from the mixer and also prevents the mix from traveling up the shaft 11 and into the socket and bearing assemblies (not shown).

The ring 17 and the elements 13 are preferably formed separately from the shaft 11 and secured thereto by soldering or brazing. The solder serves to form a fillet between the element 13 and the shaft 11 and eliminates the sharp crevices or cracks in which particles of the mix might otherwise become lodged.

The lower end of the shaft 11 is turned down to a smaller diameter to provide a shoulder 18, the impeller element 12 being pressed on to the cut-down portion of the shaft 11 and lying against the shoulder 18. The end of the shaft projecting through the element 12 is preferably upset by peening to hold the element 12 in place. The upper portion of this element is then soldered or brazed to the shaft 11 in the same manner as the element 13 to provide a fillet.

The elements 12 and 13 are cut from sheet material by stamping and in the preferred embodiment the cut blanks are substantially identical. Each of the elements 12 and 13 is in the form of a cross having a square central portion 20 and four arms or blades. The blades 21 of the upper disintegrator element 13 lie in a plane perpendicular to the axis of the shaft 11 while the blades 22 and 23 of the lower element 12 are bent and do not lie in a plane. One pair of blades 22 is bent downwardly below the bottom of the shaft 11 and the second pair of blades 23 is bent upwardly. The blades 22 are also twisted slightly in order to give them pitch so that the mix is directed downwardly as the agitator 10 is rotated in the direction as shown by the arrows shown in Figs. 2 and 3. Similarly, the upwardly bent pair of blades 23 is pitched so as to direct the material being mixed upwardly as the agitator 10 is being rotated in this direction.

In the embodiment illustrated, the angle of pitch of each set of blades is approximately 20°. In other embodiments a different pitch angle may be provided depending on the spacing of the elements 12 and 13, the disposition of the agitator 10 with respect to the cup 25, and the speed of rotation. The optimum pitch and inclination of the blades 23 and of the impeller element 12 for any given model mixer is best determined by trial and error for three variables, agitator speed of rotation, the distance of the impeller 12 from the bottom of the cup 25, and the distance of the disintegrator 13 from the impeller enter into its determination.

The upwardly bent blades 23 are so pitched and inclined that the material of the mix in the path of these blades is thrown upwardly and inwardly into the disintegrator element 13. The other blades 22 are so pitched and inclined that the material of the mix coming into their path is directed downwardly and inwardly to the center of the bottom of the cup 25. Thus the material of the mix follows substantially the paths indicated by the arrows 26 and 27 in Figs. 1 and 3.

When mixing ice cream and milk, the lumps of ice cream being more dense than the milk tend to sink in the liquid. As a sinking lump reaches the level of the disintegrator element 13, it is thrown outwardly to the side of the cup 3 and continues to fall due to gravity and the current indicated by the arrows 26 until it reaches the level of the impeller element 23. At this point it meets the upwardly flowing current indicated by the arrows 27 which checks its descent, and it is drawn inwardly towards the impeller 12. The rotating impeller 12 then severs the lump, if sufficiently large, into two pieces, one piece being directed downwardly toward the center of the cup by a blade 22, and the other piece being moved upwardly into the disintegrator element 13 by a blade 23. Those lumps which are thrown downwardly are carried outwardly and upwardly by the current 27 and reinjected into the impeller 12. Those thrown into the disintegrator 13 are broken up thereby, and any pieces remaining after disintegration are thrown outwardly to the wall of the cup 3 where they sink and are again sucked into the impeller 12 to be cut into smaller pieces by the action of successive blades 22 and 23.

The upward flow of liquid which passes through the disintegrator 13 and on up the shaft 11 tends to prevent the cavitation or whirl-pool effect usually present in conventional drink mixers and thereby permits the mixing of a greater amount of beverage in the same size cup or the use of a smaller cup than those used in conventional mixers.

Although the agitator of the preferred embodiment has been described as having two mixing elements each having four blades, the use of elements having different numbers of blades is contemplated by this invention. For example, where a mixer is to be operated at a slower speed, a greater number of blades can be provided, each blade being larger than those of the preferred embodiment. In this manner the peripheral velocity of the blades may be held at the optimum value even though the shaft speed is lower.

In some instances it has proved desirable to employ a pair of impeller elements spaced slightly apart along the axis of the shaft instead of the single element. When this is done the blades on one element are pitched downwardly and those on the other upwardly in order to impel the mix both upwardly and downwardly.

In other instances an impeller element having wedge-shaped blades has proved desirable. When this is done one surface of the wedge-shaped blades directs the mix upwardly while the other surface directs portions of it downwardly as the agitator is rotated.

Other changes and modifications such as the adaptation of the principles of this invention to mixers in which the agitator shaft extends through the bottom of the cup, etc., will occur to those familiar with the art may be made without departing from the spirit of this invention whose scope is defined by the following claims.

What is claimed is:

1. A drink mixer agitator comprising a rotatable shaft, a mixing element carried by said shaft having a plurality of radially extending blades, alternate blades being bent upwardly and downwardly from the point of attachment to the shaft so as to sweep through different areas, the upwardly bent blades being so pitched as to direct part of the mix upwardly and the downwardly bent blade being so pitched as to direct another part of the mix downwardly as the agitator is rotated.

2. In a fluid agitator for a mixer having a rotatable shaft with a fixed axis and direction of rotation, an integral impeller having a plurality of peripherially spaced blades, a first group of said blades including alternately spaced blades of said plurality being inclined upwardly from a plane perpendicular to the axis of the rotatable shaft, a second group of said blades including the remainder of said plurality of blades being depressed below the plane perpendicular to the axis of rotation, said first group of blades being displaced in a clockwise direction as viewed from their ends and said second group being displaced in a counterclockwise direction as viewed from their outer ends whereby the opposite indentations and displacements of the plurality of blades produce currents in the fluid which are inward toward the shaft and vertically away from the impeller.

3. In a fluid agitator for a mixer having a rotatable shaft with a fixed axis and direction of rotation, an integral impeller having a plurality of peripherially spaced blades, a first group of said blades including alternately spaced blades in said plurality being upwardly inclined from a plane perpendicular to the axis of rotation of said shaft, a second group of said blades including the remainder of said plurality being depressed downwardly from the plane perpendicular to said axis of rotation, the first group of blades being displaced 20° in a clockwise direction as viewed from their ends from the plane of the inclined blades about an axis extending longitudinally through the center of the blade, and said second group being displaced 20° in a counterclockwise direction as viewed from their ends from the plane of the depressed blade whereby the depressions, inclinations, and displacements of the blades produce currents in the fluid which are inward toward the shaft and vertically away from the impeller.

FRED C. SCHWANEKE.

REFERENCES CITED

The following references are of record in the file of this patent:

UNITED STATES PATENTS

| Number | Name | Date |
|---|---|---|
| 64,824 | Yingling et al. | May 14, 1867 |
| 780,926 | Welds | Jan. 24, 1905 |
| 936,182 | Steidle | Oct. 5, 1909 |
| 1,031,666 | Richmond | July 2, 1912 |
| 1,219,491 | Santicola | Mar. 20, 1917 |
| 1,415,679 | Murphy | May 9, 1922 |
| 1,437,246 | Horton | Nov. 28, 1922 |
| 1,560,693 | Jembrzycki | Nov. 10, 1925 |
| 2,061,547 | Bumpus | Nov. 24, 1936 |
| 2,201,947 | Valentine | May 21, 1940 |
| 2,203,672 | Chester | June 11, 1940 |
| 2,304,476 | Poplawski | Dec. 8, 1942 |
| 2,368,977 | Fasold | Feb. 6, 1945 |